(12) United States Patent
Theobald (10) Patent No.: US 7,347,467 B2
(45) Date of Patent: Mar. 25, 2008

(54) FIFTH WHEEL HOOK/TANDEM HOOK RELEASE TOOL

(76) Inventor: Ellen Theobald, 1004 S. Section Ave., Spring Valley, MN (US) 55975

( * ) Notice: Subject to any disclaimer, the term of this patent is extended or adjusted under 35 U.S.C. 154(b) by 0 days.

(21) Appl. No.: 10/928,816

(22) Filed: Aug. 30, 2004

(65) Prior Publication Data

US 2006/0043746 A1    Mar. 2, 2006

(51) Int. Cl.
*B66F 3/00* (2006.01)
*B62D 53/08* (2006.01)

(52) U.S. Cl. .......................... 294/24; 294/17; 254/131
(58) Field of Classification Search .................. 294/15, 294/17, 18, 19.1, 24, 26; 254/129, 131; 280/433
See application file for complete search history.

(56) References Cited

U.S. PATENT DOCUMENTS

| | | | | |
|---|---|---|---|---|
| 1,829,490 A | * | 10/1931 | Parrish | 294/17 |
| 3,436,778 A | * | 4/1969 | Stevens et al. | 294/15 |
| 4,050,107 A | * | 9/1977 | Parma | 294/24 |
| 4,251,089 A | * | 2/1981 | Skaggs | 280/433 |
| 5,176,363 A | * | 1/1993 | Bowlin | 254/131 |
| 5,378,007 A | * | 1/1995 | Joyce | 280/441 |
| 5,423,567 A | * | 6/1995 | Upton | 294/17 |
| 5,803,518 A | * | 9/1998 | Gibbons | 294/18 |
| 6,290,211 B1 | * | 9/2001 | Pheiffer | 254/131 |
| 6,375,162 B1 | * | 4/2002 | Johnson | 254/131 |
| 2003/0201651 A1 | * | 10/2003 | Lockhart | 294/17 |

\* cited by examiner

*Primary Examiner*—Saul Rodriguez
*Assistant Examiner*—Paul T Chin
(74) *Attorney, Agent, or Firm*—Weiner & Burt, P.C.; Irving M. Weiner; Pamela S. Burt

(57) ABSTRACT

A multi-purpose, hand-operated tool for use in release of a fifth wheel from a pulling or towing vehicle, for use in release of tandem pins allowing a tandem tire assembly to slide along an undercarriage of a trailer for proper weight distribution of a load, for use as a tire thumper to ensure proper inflation of tires, and for use as a spotter device when backing into visually difficult areas.

3 Claims, 7 Drawing Sheets

FIFTH WHEEL HOOK/TANDEM HOOK RELEASE TOOL

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION (1) Field of the Invention

This invention relates to tools, and more particularly to a decoupling tool for unlocking a fifth wheel assembly to allow decoupling of a trailer from a tractor.

(2) Description of the Related Art

In large highway transport vehicles of the tractor-trailer type, an assembly commonly referred to as a fifth wheel is mounted on the rear of the tractor above the drive tires for coupling of a trailer to the tractor. The fifth wheel assembly has a locking device that receives an independent kingpin attached to the trailer and allows the trailer to pivot when attached to the tractor.

The fifth wheel assemblies, although varying somewhat from one manufacturer to another, are all basically the same with regard to their configuration and operation. In general, fifth wheel assemblies will automatically lock the trailer's kingpin in place when backing the tractor into a trailer therefore causing the fifth wheel to engage the locking jaws around the kingpin. Fifth wheel assemblies are provided with a release, or unlocking handle which, in most cases, must be manually pulled so that decoupling of the trailer from the tractor can be accomplished.

As is well known in the art, pulling the release handle to unlock the fifth wheel assembly can be a very dirty job and often times difficult thing to accomplish. In some cases the operator has sustained injuries related to this difficult duty.

The pivot operation of fifth wheel assemblies requires that they be covered with grease for proper operation, and they are almost constantly being subjected to mud, slush, snow, road tar, and other contaminates due to their physical location adjacent to the rear wheels of the tractor. The grease and road contamination, both on the fifth wheel itself and the surrounding areas such as the tractor's wheels and the frame and the underside of the trailer, make this less than ideal place to which the vehicle's operator must reach or crawl in order to pull the fifth wheel release handle.

When both the trailer and the tractor are on a substantially level, or evenly sloping surface, manual pulling of the fifth wheel release handle is usually an easy thing to accomplish. However, if the angular rotation of the trailer about its longitudinal axis differs from the angular rotation of the tractor about its longitudinal axis, the locking mechanism of the fifth wheel assembly can be subjected to binding forces which make it difficult, if not impossible, for anyone to pull the release handle. Such binding is not an infrequent occurrence, and when it does occur, the vehicle's operator has heretofore been required to reposition the tractor and the trailer until he achieves a substantially aligned position. Sometimes the properly aligned position of the tractor and trailer can be achieved with a single repositioning maneuver, and sometimes the operator will spend considerable time before he achieves the required alignment.

This repositioning of the tractor and trailer to relieve binding of the fifth wheel can be a very time-consuming and costly operation, which, in conjunction with the inherently dirty area, can be very frustrating to the operator of the vehicle, and costly to him/her with regard to ruining clothes, bodily injury, and time.

The other main issue this tool addresses is the tandem release for the tandem tires on the trailer of the tractor trailer assembly. The tandem pins may be released in order to balance the weight of the trailer better. In order to do this, the tandem lever, located under the trailer near the tandem tires, must be inserted into the locking slot. This can be a very difficult and sometimes next to impossible job for one person if the pins are wedged slightly out of place. There are several tools to assist in releasing the tandem pins; however, these tools can break easily or not provide enough leverage to release the pins. At times it takes several persons to release the pins. The said invention provides not only strength, but also leverage to maneuver the pins.

The tool also provides a tire pressure check device and spotter tool on-board to assist a driver in checking the actor-trailer for safety and maneuvering the tractor-trailer into tight locations. This exists in separate tools; however, with the limited space provided in a tractor, the on-board tool creates a simplified and convenient location for storing several tools in one.

To the best of my knowledge, no new or improved device has been developed or suggested for assisting the operator in such tractor-trailer decoupling operations or load-balancing operations. Therefore, a need exists for a new and useful decoupling/load balancing tool, which facilitates the unlocking of the fifth wheel assemblies.

SUMMARY OF THE INVENTION

The present invention provides a multi-purpose, hand-operated tool for use in release of a fifth wheel from a pulling or towing vehicle, for use in release of tandem pins allowing a tandem tire assembly to slide along an undercarriage of a trailer for proper weight distribution of a load, for use as a tire thumper to ensure proper inflation of tires, and for use as a spotter device when backing into visually difficult areas, comprising, in combination: a main body shaft tube having a plurality of adjusting first cylindrical holes therethrough; a removable tire thumper/spotter device/torque handle component slidably, adjustably and removably positioned within said main tube via a first end of said main tube; said handle component having a second cylindrical hole therethrough; first locking means positioned through said second cylindrical hole and a selected one of said plurality of adjusting first cylindrical holes to secure said handle component to said main tube; a non-metallic end cap non-rotatably affixed to a second end of said main tube serving as a fulcrum for said main tube and said secured handle component; a main body shaft plate assembly welded to said main tube; a first completely-cylindrical storage holder welded to said main tube proximate said plate assembly; a second completely-cylindrical storage holder welded to said main tube proximate said first end of said main tube; a pivot tube secured to said plate assembly; said pivot tube having a plurality of adjusting third cylindrical holes therethrough; a fifth wheel hook member having a first predetermined length, a curved hook portion, and a fourth cylindrical hole therethrough; a tandem hook member having a second predetermined length, a curved hook portion, and a fifth cylindrical hole therethrough, said first predetermined length being greater than said second predetermined length; said fifth wheel hook member or said tandem hook member being selectively slidable in said pivot tube; said tandem book member or said fifth wheel hook member being selectively axially slidable in said first completely-cylindrical storage holder and said second completely-cylindrical storage holder; second locking means positioned through a selected one of said plurality of adjusting sixth cylindrical holes and said fourth or fifth cylindrical hole to adjustably secure said fifth wheel hook member or said tandem hook member, respectively, to said pivot tube; said second completely-cylindrical storage holder having a seventh cylindrical hole therethrough; third locking means positioned through said seventh cylindrical hole and said fifth cylindrical hole to secure said tandem hook member within said first and second completely-cylindrical storage holders and to said main tube so that said curved hook portion of said tandem hook member lays flat against a major external surface of said a main body shaft plate assembly welded to said main tube; said curved hook portion of said fifth wheel hook member being adapted to loop over the fifth wheel release handle, and said non-rotatable fulcrum end cap being adapted to bear against the pulling or towing vehicle to enable said tool to pull the fifth wheel release handle to disengage said fifth wheel assembly; said curved hook portion of said tandem hook member being adapted to engage over the tandem pins release lever, and said non-rotatable fulcrum end cap being adapted to bear against a vehicle to enable said tool to release the tandem pins release lever; and said removable tire thumper/spotter device/torque handle component being completely removable from said main tube for use as a tire thumper to ensure proper inflation of tires, and for use as a spotter device when backing into visually difficult areas.

This invention, called The Universal E. C. Pull Adjustable, Multiple use, fifth Wheel Release hook with sliding tandem pin puller, tire tester and spotter tool, is a portable combination tool for use by truck drivers that provides numerous functions that were previously only available to several other separate tools. The present tool has two (2) telescoping tubes that are held in position by locking cotter-type pins. The hook-tube portion of the assembly attaches to the structure of a fifth-wheel release handle to facilitate the trailer's release from the semi-tractor. The additional book attachment is used to facilitate the release of the tandems mounted to the undercarriage of a semitrailer. The grip portion of said tool assembly is used to provide leverage for facilitation of the release of the trailer from the semi-tractor or pulling unit. No springs are used in this device. The grip portion of the tool assembly may be used independently as a tire thumper to check proper air inflation of truck tires, or as a spotter device in limited visually difficult areas.

In accordance with the present invention, an improved new and useful decoupling tool is disclosed for assisting an operator in unlocking the fifth wheel assembly by which the trailer is demountably coupled to the tractor of a road transport vehicle.

The decoupling tool includes a lever bar having surface, engaging means formed on one end thereof with a handle grip on its opposite end. A pivot arm extends laterally from the cylindrical lever bar at a location between the surface engaging and handle grip ends thereof, and an elongated rod has one of its ends telescopically connected in said pivot arm to form a hook member. To unlock the fifth wheel, and operator places the hook member of the elongated rod in a looped-over engagement with the release handle of the fifth wheel assembly, and portion of the lever bar so that the surface engaging thereof is in bearing engagement with any suitable vertical side surface of the vehicle such as the sidewall of one of the rear tires of the tractor, or the vertical side of the trailer. In such a position, the surface-engaging end of the lever bar forms a fulcrum end and the operator simply grasps the handle grip end and pulls it toward him to release the handle of the fifth wheel assembly.

The decoupling tool of the present invention as described above enables an operator to easily unlock the fifth wheel assembly of a tractor-trailer vehicle regardless of the binding forces applied thereon by misalignment of the trailer relative to the tractor, and such unlocking may be accomplished without requiring the operator to reach or crawl into the immediate area of the fifth wheel assembly. Accordingly, it is the objective of the present invention to provide a new and useful decoupling tool for unlocking the fifth wheel assembly by which the trailer is demountably coupled to the tractor of a road transport vehicle.

Another objective of the present invention is to provide a new and useful decoupling tool for unlocking the fifth wheel assembly of a tractor-trailer vehicle with the tool enabling an operator to accomplish such unlocking without requiring that he reach or crawl into the immediate area of the fifth wheel assembly.

Another object of the present invention is to provide a new and useful decoupling tool of the above described character which includes a lever bar having a surface engaging end and a removable torque handle with grip end with an elongated hook rod inserted into a pivot arm and extending laterally from said lever bar between the opposite ends thereof in which the surface engaging end of the lever bar is formed by a transverse cylindrical pivot arm pipe attached intermediate its opposite ends to the end of the lever bar.

Yet another object of the present invention is to provide a new and useful decoupling tool of the above described character in which both of the opposite ends of the lever bar are coated with a rubber-like material.

Still another object of the present invention is to provide a new and useful decoupling tool of the, above described, type where the handle can be removed and used separately as a tire thumper or vehicle spotter device.

The above said tool is used in unlocking the two most common types of fifth wheel locking mechanisms which allows separation of a semi-tractor fifth wheel from the trailer king pin. Altering the fifth wheel hook in the adjustment holes on the pivot arm makes this tool more adaptable for drivers. At its shortest position on the pivot arm the fifth wheel hook is placed around the fifth wheel assembly and the fulcrum end of the tool is placed in bearing engagement against a suitable side surface of the trailer or vehicle. The handle of the tool is now angled in approx. 45 degrees from the fifth wheel assembly between the drive tires. When the movement of said handle is pulled in an arc toward the operator, the fifth wheel assembly will release when the tool handle is approximately 45 degrees away from the tractor-trailer unit. Altering the fifth wheel hook to its shortest length allows for decoupling in tighter areas such as: rail yards, small dock, drop yards, and compact spaces. The difficulty of other fifth wheel tools is they can only be used in areas where there is adequate room between vehicles. This new and improved tool solves this problem.

The uniqueness of this special tool is the ability to alter the decoupling fifth wheel hook member for sliding tandem hook member, (a) which is stored on the tool and (b) to change the fifth wheel hook for the tandem hook. The procedure is to remove the hook's locking pin from the adjustable pivot arm to replace the longer fifth wheel hook with the shorter tandem release hook member. Then after securing the shorter tandem release hook member, in the pivot arm of the decoupling tool, engage the tandem hook over the tandem release lever. Place the fulcrum end of the lever bar or tube handle against the trailer or suitable side surface of the vehicle. Pull the handle. This allows the tandem release handle to drop into the locking slot. The pins are disengaged from the tandem slider mechanism. This action frees the pins so the tandems can be moved to allow for proper weight distribution. After the tandems are moved into proper position, take the removable handle out of the main body shaft of the tool. Use it to rap the release tandem handle on the trailer. This re-engages the pins into locking position. The tandem hook can also be lengthen to provide more leverage to release the locking pins by pulling lever partially out when the tandem pins are wedged or bounded up. When the lever is partially pulled, the hook can be shortened to provide better leverage to release the lever into the locking slot releasing the tandem pins. This simplifies the work normally done by three people into a job for one.

The foregoing and other objects of the present invention, as well as the invention itself, may be more fully understood from the following description when read in conjunction with the accompanying drawings.

DESCRIPTION OF THE PREFERRED EMBODIMENT

With reference to FIGS. 1-14, there is shown a preferred embodiment of the present invention which is multipurpose, hand-operated tool 50: used in the release of the fifth wheel from pulling or towing vehicles; and the release of the trailer's tandem pins, thus allowing the tandem tire assembly to slide along the undercarriage of a trailer for proper weight distribution of a load; for use as a tire thumper to ensure proper inflation of ties; and for use as a spotter device when backing into visually difficult areas.

Figure 1:
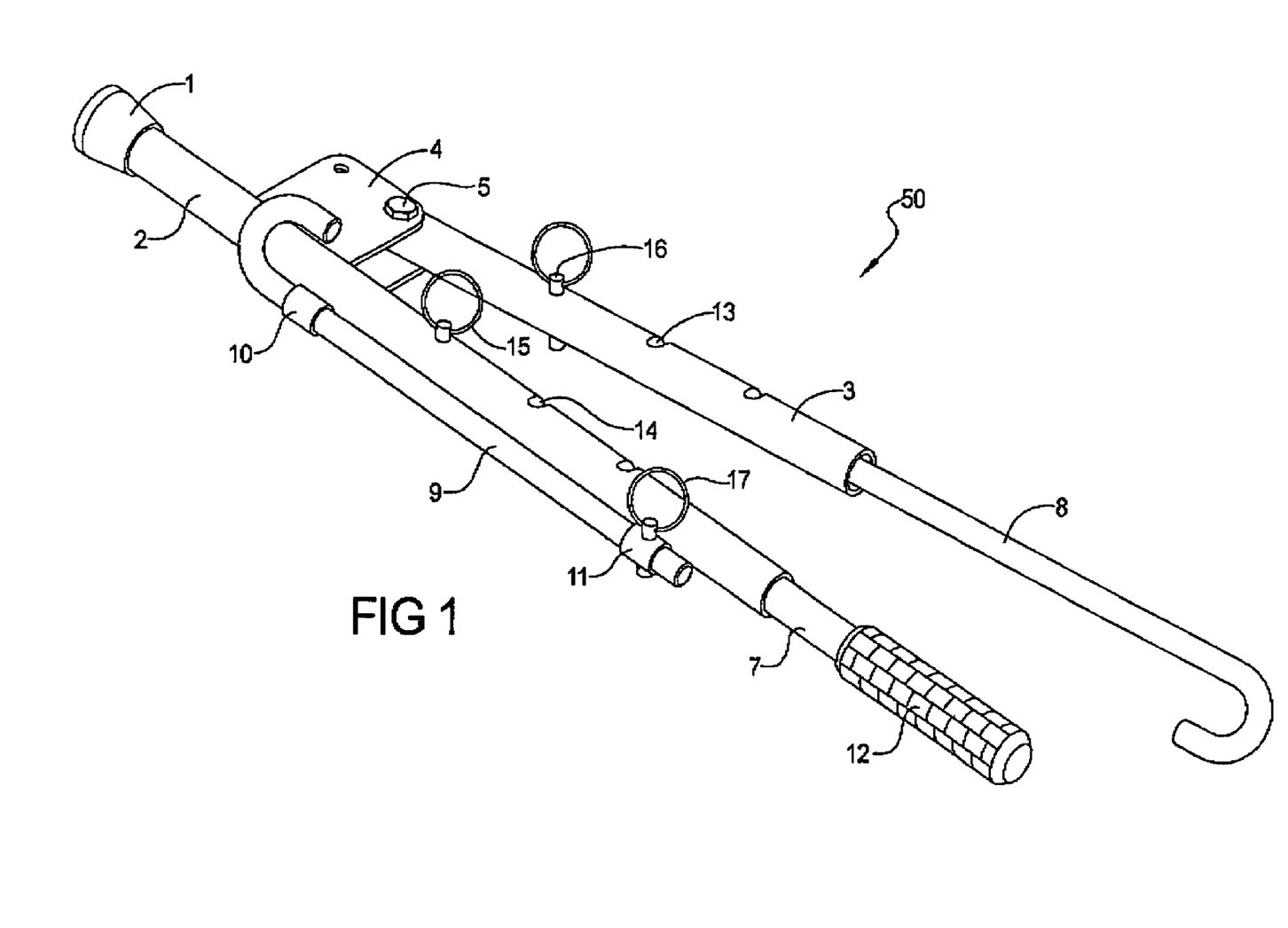
FIG. 1 shows a perspective view of a preferred embodiment of the invention.
Figure 2:
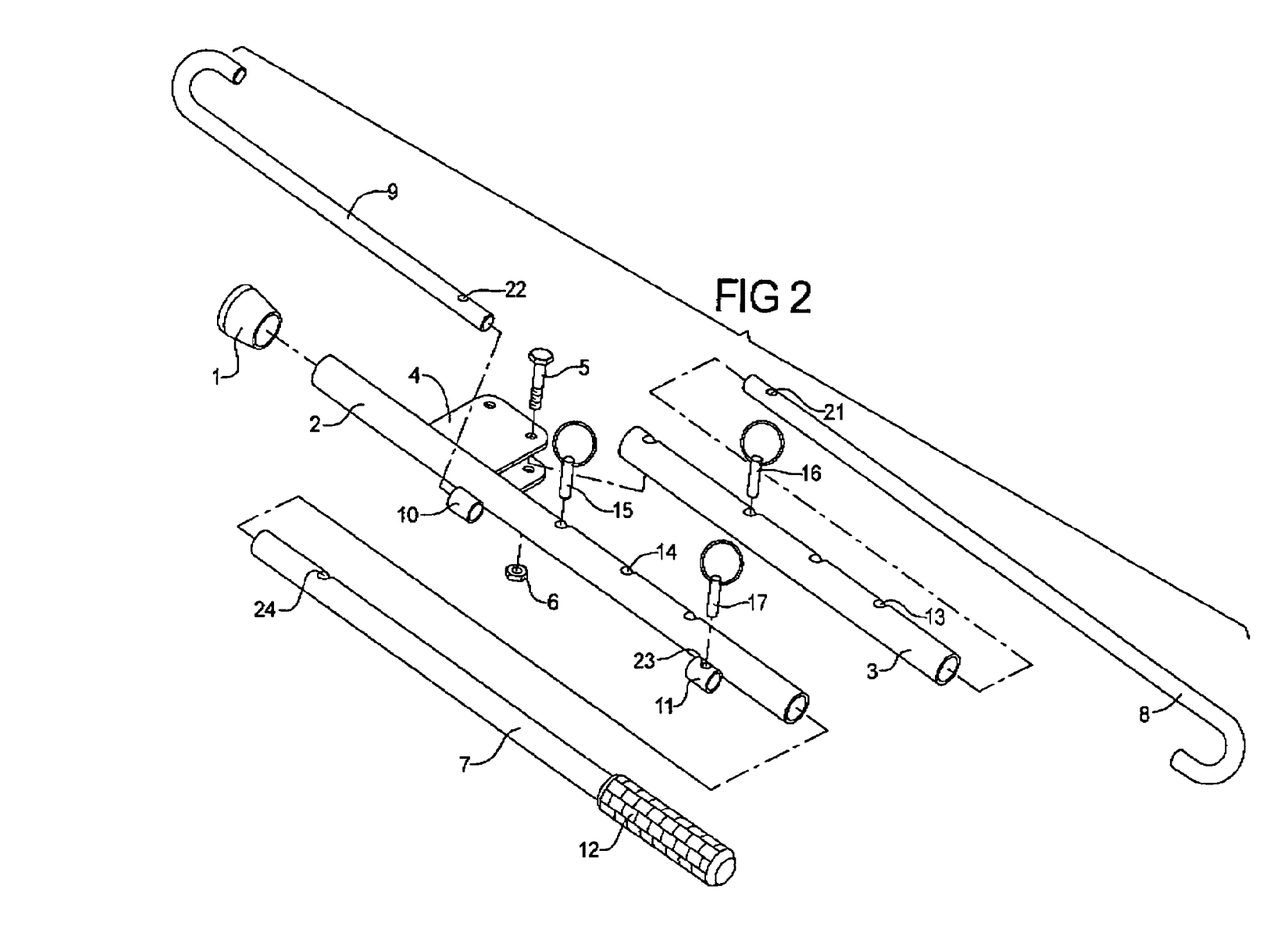
FIG. 2 is an exploded view showing how the components of the FIG. 1 embodiment are assembled.
Figure 3:
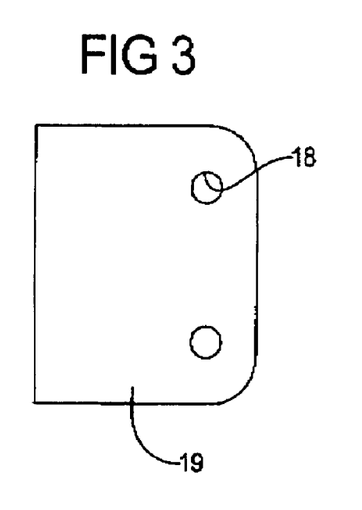
FIG. 3 is a top view of plate 19.
Figure 4:
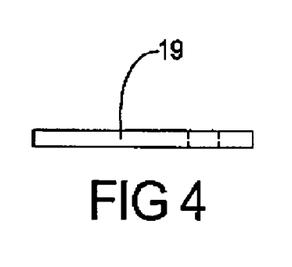
FIG. 4 is a side view of FIG. 3.
Figure 5A:
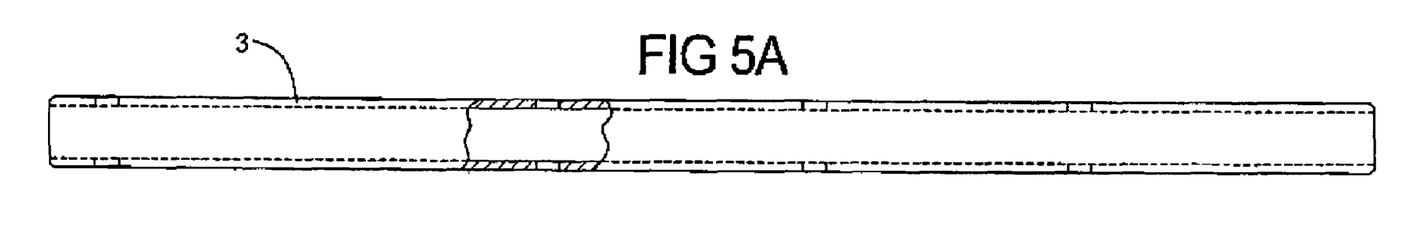
FIG. 5A is a longitudinal cross-sectional view of pivot tube.
Figure 5B:
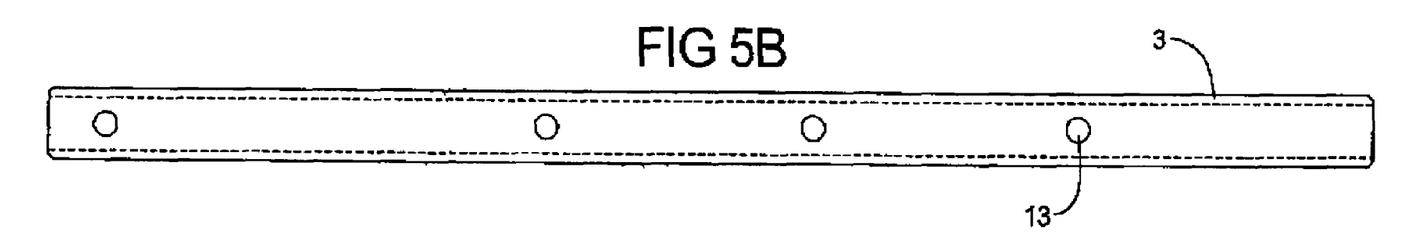
FIG. 5B is a top view of FIG. 5A.
Figure 5C:
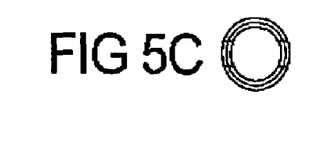
FIG. 5C is a cross-sectional view of FIG. 5B.
Figure 6A:
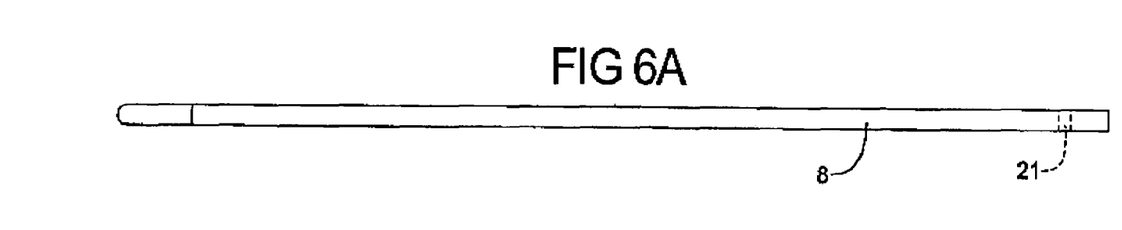
FIG. 6A is a top view of the fifth wheel hook member.
Figure 6B:
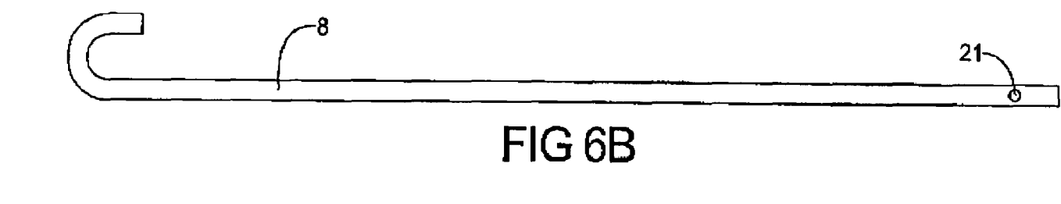
FIG. 6B is a side elevational view of FIG. 6A.
Figure 6C:
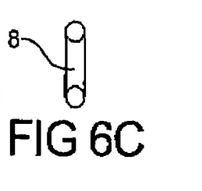
FIG. 6C is an end view of FIG. 6B.
Figure 7A:
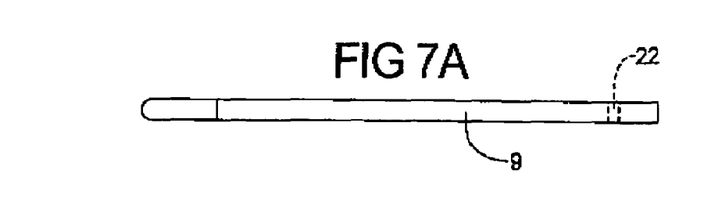
FIG. 7A is a top view of the tandem hook member.
Figure 7B:
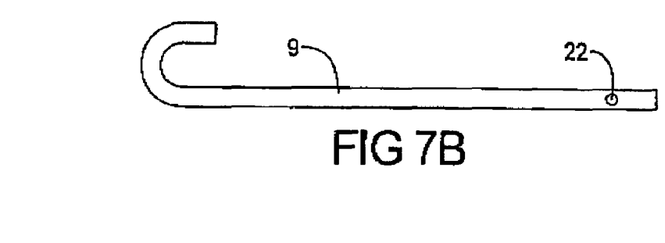
FIG. 7B is a side elevational view of FIG. 7A.
Figure 7C:
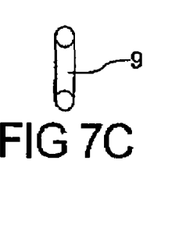
FIG. 7C is an end view of FIG. 7B.
Figure 8:
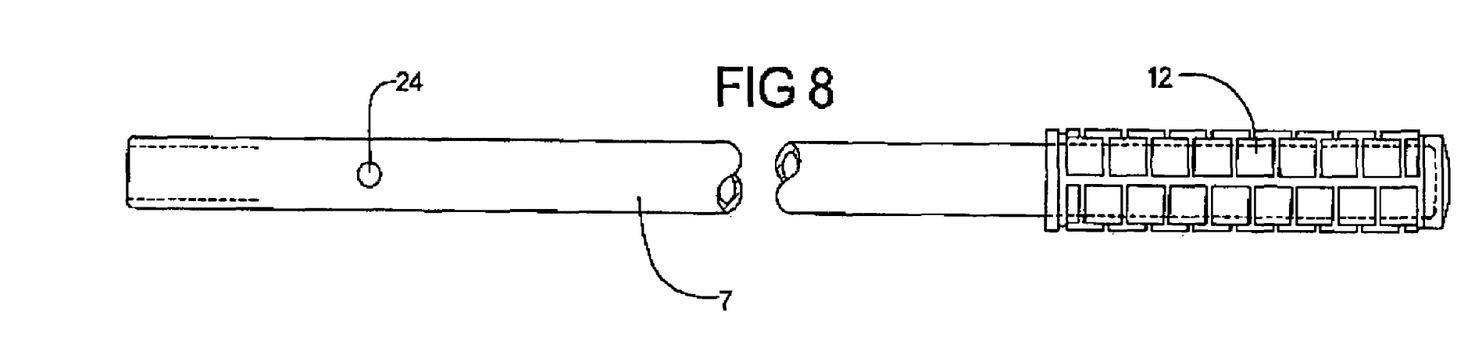
FIG. 8 is a fragmentary view of handle and grip members.
Figure 9A:
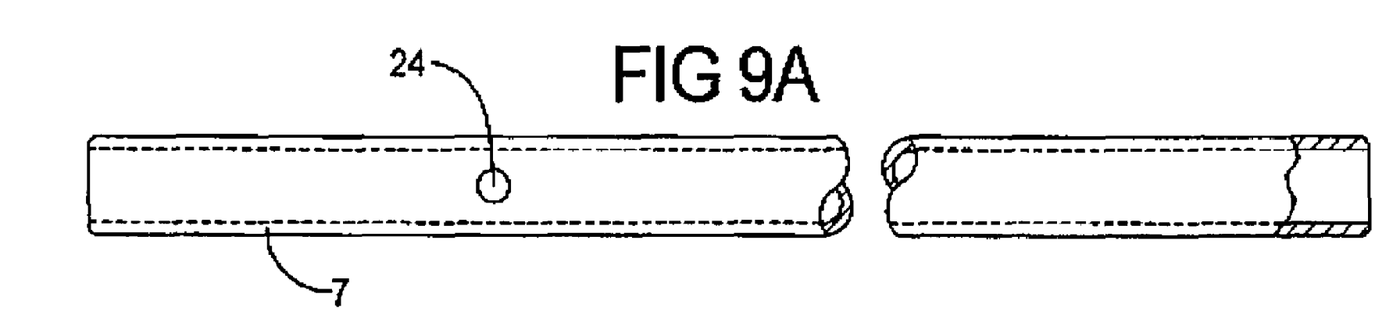
FIG. 9A is a fragmentary cross-sectional view of the handle member.
Figure 9B:
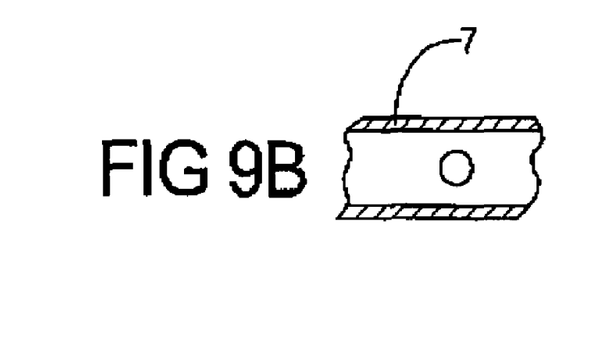
FIG. 9B is a longitudinal cross-sectional view of a portion of FIG. 9A.
Figure 9C:
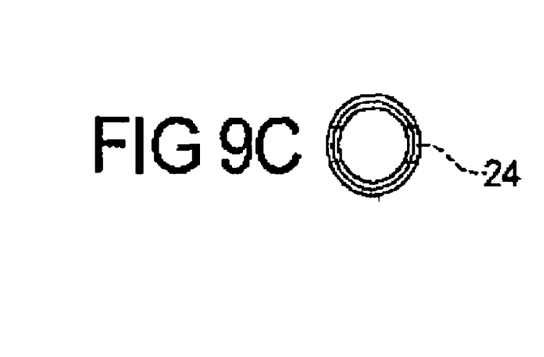
FIG. 9C is a transverse section of FIG. 9A.
Figure 10:
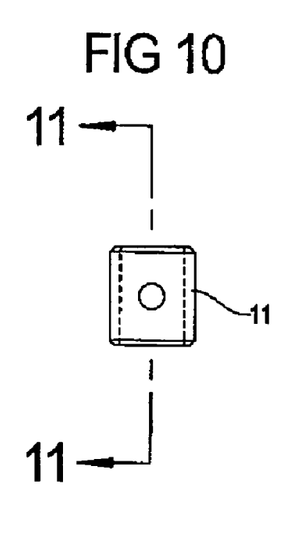
FIG. 10 is a side elevational view of the bottom holder.
Figure 11:
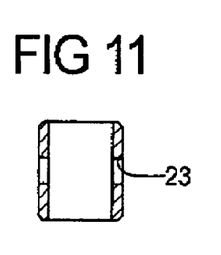
FIG. 11 is a view taken along the line 11-11 in FIG. 10.
Figure 12:
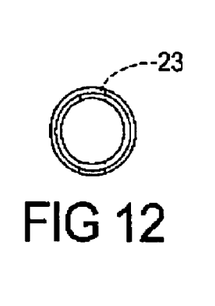
FIG. 12 is transverse section of FIG. 10.
Figure 13:
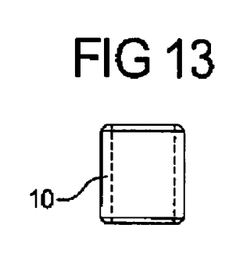
FIG. 13 is a side elevational view of the top holder.
Figure 14:
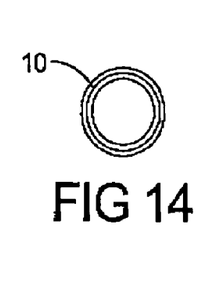
FIG. 14 is a transverse section of FIG. 13.

The multipurpose tool 50 includes an end cap 1, a main body shaft 2 with adjustment holes 14, a pivot arm 3 with adjustment holes 13, a main storage body shaft plate assembly 4 and extra pin storage hole 18, a hex-headed bolt 5, a nut 6 for the hex-headed bolt 5, a torque handle/removable tire thumper 7 with a hole 24, a 27-inch fifth wheel hook member 8 with a hole 21, a 12-inch tandem hook 9 with a hole 22, a first tandem hook storage holder 10, a second tandem hook storage holder 11 with a hole 23, a rubber grip 12 for the torque handle 7, and three locking ring pins 15, 16 and 17.

The main body shaft 2 is a housing that is the storage unit for all the different tools. The main body shaft 2 is provided with three holes 14 to permit adjustment of the length of handle 7. Inserted into the bottom of the main body shaft 2 is the removable torque handle 7 (which also serves as a tire thumper and spotter device). At the top of the main body shaft 2 is a rubber end cap 1 which absorbs shock and eliminates dragging of metal against metal when it is placed against the side of a trailer or other side surface of a vehicle.

The shaft plate assembly 4 is welded to the main body shaft 2. The plate assembly 4 includes two plates 19 and 20 which secure the pivot arm 3 in place with the hex bolt 5 and the locking nut 6, and functions as a hinge unit. The pivot arm 3 has three adjustment holes 13 to secure the fifth wheel hook 8 or the tandem hook 9. The main body shaft 2 housing has on-board tandem hook storage holders 10 and 11 where the tandem hook 9 is stored when it is not being used.

To assemble the tool 50, first the end cap 1 is placed onto the top of the main body shaft 2. Next, the adjustable hook pivot arm 3 is placed into the plate assembly 4, and secured with bolt 5 and nut 6. Then, the torque handle 7 is slid inside the main body shaft 2, and secured with the ring pin 15 via a selected hole 14. Next, the fifth wheel hook 8 is slid inside the adjustable pivot arm 3, and secured with the ring pin 16 via a selected hole 13. Then, the tandem hook 9 is placed into the storage holders 10 and 11 with the hook end laying flat against the plate assembly 4, and secured in place with the locking ring pin 17 through the bottom storage holder 11.

The multiple function, adjustable tool 50 is designed to aid drivers in releasing the tractor from the trailer, sliding tandems, checking tires, and as a ground spotting device. The user of the tool 50 has the ability to change the tool's length and leverage in a variety of different situations.

Referring more particularly to the portion of the rear of a typical tractor having the usual frame and wheels. As is the case in all tractor-trailer road hauling vehicles, the tractor has a fifth wheel assembly, mounted on the frame between the wheels and the fifth wheel assembly (not shown).

A fifth wheel assembly as is known in the art, is a device by which a trailer is demountably coupled to the tractor. The fifth wheel assembly includes the usual plate having a spaced pair of rearwardly extending guide arms or rails, which define a radial channel leading to the center of the plate, where a kingpin locking jaw mechanism is located.

Connection of the trailer to the fifth wheel assembly is accomplished by backing up the tractor toward a parked trailer so that the kingpin appendage provided on the trailer will be locked and gripped by the kingpin locking jaw mechanism of the fifth wheel assembly. Such coupling is automatically done, i.e., when entry of the kingpin into the locking mechanism triggers this mechanism, it produces the locking function. However, unlocking must be accomplished manually, and a release handle is provided on the fifth wheel for that purpose. The release handle extends from the fifth wheel assembly toward one of its sets of wheels and when an operator pulls that handle, a suitable linkage is operated to unlock the kingpin locking jaw mechanism. It is to be understood that fifth wheel assemblies will differ somewhat from one manufacturer to another, but in general the structures and operation are in accordance with the above description.

As hereinbefore described, operation of the release handle of the fifth wheel assembly is an undesirable task due to grease, dirt, and the like, which are present on and in the vicinity of the fifth wheel, and this task can be very time-consuming and difficult due to binding forces produced by misalignment of the trailer and the tractor. Therefore, in accordance with the present invention, a decoupling tool 50, which is indicated in its entirety in FIG. 1 illustrating a completed top perspective view of the assembled decoupling tool, is disclosed for assisting an operator in manually operating the release handle of fifth wheel assembly thereby disconnecting the vehicle.

Also, addressed by this tool 50 is the tandem release for the tandem tires on the trailer of the tractor-trailer assembly. The tandem pins may be released in order to balance the weight of the trailer better. In order to do this, the tandem lever, located under the trailer near the tandem tires, must be inserted into the locking slot. This can be a very difficult and sometimes next to impossible job for one person if the pins are wedged slightly out of place. This tool 50 provides a tandem hook 9 that provides not only strength, but also leverage to maneuver the pins.

The tool 50 also provides a tire pressure check device and spotter tool by using the removable torque handle/combination tire tester 7 which is provided on-board to assist a driver in checking the tractor-trailer for safety and maneuvering the tractor-trailer into tight locations.

I claim:

1. A multi-purpose, hand-operated tool for use in release of a fifth wheel from a pulling or towing vehicle, for use in release of tandem pins allowing a tandem tire assembly to slide along an undercarriage of a trailer for proper weight distribution of a load, for use as a tire thumper to ensure proper inflation of tires, and for use as a spotter device when backing into visually difficult areas, comprising, in combination:

a main body shaft tube having a plurality of adjusting cylindrical holes therethrough;

a removable torque handle component slidably, adjustably and removably positioned within said main tube via a first end of said main tube;

said removable component having a cylindrical hole therethrough;

first locking means positioned through a selected one of said plurality of adjusting cylindrical holes and said cylindrical hole in said removable component to secure said removable component in said main tube;

a non-metallic end cap non-rotatably affixed to a second end of said main tube serving as a fulcrum for said main tube and said secured removable component;

a main body shaft plate assembly welded to said main tube;

a first completely-cylindrical storage holder welded to said main tube proximate said plate assembly;

a second completely-cylindrical storage holder welded to said main tube proximate said first end of said main tube;

said second completely-cylindrical storage holder having a locking hole therethrough along a diameter of said second completely-cylindrical storage holder;

a pivot tube secured to said plate assembly;

said pivot tube having a plurality of adjusting cylindrical holes therethrough;

a fifth wheel hook member having a first predetermined length, a curved hook portion, and a cylindrical hole therethrough;

a tandem hook member having a second predetermined length, a curved hook portion, and a cylindrical hole therethrough;

said first predetermined length being greater than said second predetermined length;

said fifth wheel hook member or said tandem hook member being selectively slidable in said pivot tube;

said tandem hook member or said fifth wheel hook member being selectively axially slidable in said first completely-cylindrical storage holder and said second completely-cylindrical storage holder;

second locking means positioned through a selected one of said plurality of adjusting cylindrical holes of said pivot tube and said cylindrical hole of said fifth wheel hook member or of said tandem hook member to adjustably secure said fifth wheel hook member or said tandem hook member, respectively, to said pivot tube;

said second completely-cylindrical storage holder having a cylindrical hole therethrough;

third locking means positioned through said locking hole of said second completely-cylindrical storage holder and said cylindrical hole of said tandem hook member to secure said tandem hook member within said first and second completely-cylindrical storage holders and to said main tube so that said curved hook portion of said tandem hook member lays flat against a major external surface of said a main body shaft plate assembly welded to said main tube;

said curved hook portion of said fifth wheel hook member being adapted to loop over the fifth wheel release handle;

said non-rotatable fulcrum end cap being adapted to bear against the pulling or towing vehicle to enable said tool to pull the fifth wheel release handle to disengage said fifth wheel assembly;

said curved hook portion of said tandem hook member being adapted to engage over the tandem pins release lever;

said non-rotatable fulcrum end cap being adapted to bear against the vehicle to enable said tool to release the tandem pins release lever; and said removable component being completely removable from said main tube for use as a tire thumper to ensure proper inflation of tires, and for use as a spotter device when backing into visually difficult areas.

2. A multi-purpose, hand-operated tool for unlocking a fifth wheel release handle of a fifth wheel assembly connecting two vehicles, for pulling a tandem release lever to release tandem pins of a tandem wheel assembly, for use as a tire thumper to ensure proper inflation of tires, and for use as a spotter device when backing into visually difficult areas, comprising, in combination:

a main body shaft tube having a plurality of adjusting first cylindrical holes therethrough;

a removable tire thumper component slidably, adjustably and removably positioned within said main tube via a first end of said main tube;

said handle component having a second cylindrical hole therethrough;

first locking means positioned through said second cylindrical hole and a selected one of said plurality of adjusting first cylindrical holes to secure said tire thumper component to said main tube;

a non-metallic end cap non-rotatably affixed to a second end of said main tube serving as a fulcrum for said main tube and said secured tire thumper component;

a main body shaft plate assembly welded to said main tube;

a first completely-cylindrical storage holder welded to said main tube proximate said plate assembly;

a second completely-cylindrical storage holder welded to said main tube proximate said first end of said main tube;

said completely-cylindrical storage holder having a locking hole therethrough along a diameter of side second completely-cylindrical storage holder;

a pivot tube secured to said plate assembly;

said pivot tube having a plurality of adjusting third cylindrical holes therethrough;

a fifth wheel hook member having a first predetermined length, a curved hook portion, and a fourth cylindrical hole therethrough;

a tandem hook member having a second predetermined length, a curved hook portion, and a fifth cylindrical hole therethrough;

said first predetermined length being greater than said second predetermined length;

said fifth wheel hook member or said tandem hook member being selectively slidable in said pivot tube;

said tandem hook member or said fifth wheel hook member being selectively axially slidable in said first completely-cylindrical storage holder and said second completely-cylindrical storage holder;

second locking means positioned through a selected one of said plurality of adjusting sixth cylindrical holes and said fourth or fifth cylindrical hole to adjustably secure said fifth wheel hook member or said tandem hook member, respectively, to said pivot tube;

said second completely-cylindrical storage holder having a seventh cylindrical hole therethrough;

third locking means positioned through said seventh cylindrical hole and said fourth or fifth cylindrical hole to secure said fifth wheel hook member or said tandem hook member, respectively, within said first and second completely-cylindrical storage holders and to said main tube so that said curved hook portion of said fifth wheel hook member or said tandem hook member, respectively, lays flat against a major external surface of said a main body shaft plate assembly welded to said main tube;

said curved hook portion of said fifth wheel hook member being adapted to loop over the fifth wheel release handle, and said non-rotatable fulcrum end cap being adapted to bear against one of the vehicles to enable said tool to pull the fifth wheel release handle to disengage said fifth wheel assembly;

said curved hook portion of said tandem hook member being adapted to engage over the tandem release lever, and said non-rotatable fulcrum end cap being adapted to bear against one of the vehicles to enable said tool to pull the tandem release lever to release the tandem pins; and said removable tire thumper component being completely removable from said main tube for use as a tire thumper to ensure proper inflation of tires, and for use as a spotter device when backing into visually difficult areas.

3. A multi-purpose, hand-operated tool for use in release of a fifth wheel from a pulling or towing vehicle, for use in release of tandem pins allowing a tandem tire assembly to slide along an undercarriage of a trailer for proper weight distribution of a load, for use as a tire thumper to ensure proper inflation of tires, and for use as a spotter device when backing into visually difficult areas, comprising, in combination:

a main body shaft tube having a plurality of adjusting cylindrical holes therethrough;

a removable spotter device component slidably, adjustably and removably positioned within said main tube via a first end of said main tube;

said removable spotter device component having a cylindrical hole therethrough;

first locking means positioned through said cylindrical hole of said removable spotter device component and a selected one of said plurality of adjusting cylindrical holes to secure said removable spotter device component to said main tube;

a non-metallic end cap non-rotatably affixed to a second end of said main tube serving as a fulcrum for said main tube and said secured removable spotter device component;

a main body shaft plate assembly welded to said main tube;

a first completely-cylindrical storage holder welded to said main tube proximate said plate assembly;

a second completely-cylindrical storage holder welded to said main tube proximate said first end of said main tube;

said second completely-cylindrical storage holder having a locking hole therethrough along a diameter of said second completely-cylindrical storage holder;

a pivot tube secured to said plate assembly;

said pivot tube having a plurality of adjusting cylindrical holes therethrough;

a fifth wheel hook member having a first predetermined length, a curved hook portion, and a cylindrical hole therethrough;

a tandem hook member having a second predetermined length, a curved hook portion, and a cylindrical hole therethrough;

said first predetermined length being greater than said second predetermined length;

said fifth wheel hook member or said tandem hook member being selectively slidable in said pivot tube;

said tandem hook member or said fifth wheel hook member being selectively axially slidable in said first completely-cylindrical storage holder and said second completely-cylindrical storage holder;

second locking means positioned through a selected one of said plurality of adjusting cylindrical holes of said pivot tube and said cylindrical hole of said fifth wheel hook member or of said tandem hook member to adjustably secure said fifth wheel hook member or said tandem hook member, respectively, to said pivot tube;

said second completely-cylindrical storage holder having a cylindrical hole therethrough;

third locking means positioned through said cylindrical hole of said second completely-cylindrical storage holder and said cylindrical hole of said tandem hook member to secure said tandem hook member within said first and second completely-cylindrical storage holders and to said main tube so that said curved hook portion of said tandem hook member lays flat against a major external surface of said a main body shaft plate assembly welded to said main tube;

said curved hook portion of said fifth wheel hook member being adapted to loop over the fifth wheel release handle, and said non-rotatable fulcrum end cap being adapted to bear against the pulling or towing vehicle to enable said tool to pull the fifth wheel release handle to disengage said fifth wheel assembly;

said curved hook portion of said tandem hook member being adapted to engage over the tandem pins release lever, and said non-rotatable fulcrum end cap being adapted to bear against a vehicle to enable said toot to release the tandem pins release lever; and said removable spotter device component being completely removable from said main tube for use as a spotter device when backing into visually difficult areas.

\* \* \* \* \*